Aug. 11, 1970    W. L. HASKIN    3,523,574
THERMAL REGENERATOR

Filed March 6, 1969    2 Sheets-Sheet 2

INVENTOR.
WILLIAM L. HASKIN

United States Patent Office 3,523,574
Patented Aug. 11, 1970

3,523,574
THERMAL REGENERATOR
William L. Haskin, Dayton, Ohio, assignor to the United States of America as represented by the Secretary of the Air Force
Filed Mar. 6, 1969, Ser. No. 804,871
Int. Cl. F28d 19/04; F25b 9/00
U.S. Cl. 165—10                  3 Claims

ABSTRACT OF THE DISCLOSURE

A progressively packed thermal regenerator utilizing europium selenide, neodyminum, europium telluride, and europium sulfide as thermal regenerator materials is disclosed. Thermal regenerators utilizing one, two, or three of the above-named materials may also be fabricated.

BACKGROUND OF THE INVENTION

Field of the invention

This invention relates to thermal regenerators particularly as used in extremely low temperature refrigeration systems.

Description of the prior art

Cryogenic refrigerators of the Stirling cycle, pulse tube, and Vuilleumier types are well known. One example of refrigerators of the general type discussed may be found in U.S. Pat. No. 3,379,026. These refrigerators make use of two or more expansion stages to obtain cryogenic temperatures.

It is also well known that refrigerators of the types named above employ thermal regenerators in the process of obtaining cryogenic temperatures. Thermal regenerators may be generally described as tubes into which some thermal regenerator material has been packed. In the operation of a thermal regenerator, the working fluid of a refrigerator (for example, helium gas) is first passed through the material of the thermal regenerator under pressure. During this pass, the regenerator material extracts heat from the working fluid and stores the heat. After the first pass, under pressure, the working fluid is allowed to expand and thus be cooled even further. Then, the expanded working fluid is passed back through the thermal regenerator where the stored heat is reimparted to it.

The use of materials such as steel, copper, or bronze screens, or lead balls as regenerator materials is well known. Refrigerators utilizing these materials have been highly developed to yield temperatures down to about 20° K. However, below 20° K. these refrigerators become inefficient and temperatures below about 14° K. are practically impossible to obtain with these materials. High pressure helium gas is theoretically an extremely good regenerator material at temperatures below 20° K. but is less practical for use in actual refrigerators than solid materials. Also, helium cannot be used for temperatures below about 5.2° K. because liquefaction occurs. Thus the search has gone on for thermal regenerator materials which will provide for efficient operation of cryogenic refrigerators at temperatures below 20° K. and for materials which will permit realization of even lower cryogenic temperatures.

It is also well known that after a thermal regenerator has been operated for a short time a temperature gradient develops from one end to the other of the regenerator. The temperature gradient develops because one end of the regenerator has relatively warm gas let into it and the other end has much colder gas let into it. This has led to the development of progressively packed thermal regenerators wherein a series of materials are progressively packed to take advantage of anomalies in their heat capacity curves.

Related prior art showing a progressively packed thermal regenerator is U.S. Pat. No. 3,375,867 issued to John G. Daunt. Daunt progressively packs neodymium, samarium, and erbium to fabricate a thermal regenerator which aids in obtaining cryogenic temperatures down to about 5° K. The Daunt materials are packed in the form of perforated discs or screens having an opening size of about 200 mesh.

SUMMARY OF THE INVENTION

It has now been found that certain rare earth materials such as neodymium, europium selenide, europium telluride, and europium sulfide used in combination as thermal regenerator materials in the second or lower temperature expansion stage of a cryogenic refrigerator of the types named above permit efficient operation of the refrigerator at temperatures between about 16.4° K. and about 4° K. The materials may be used either in the form of small spheres or in the form of perforated discs. A plurality of the above-named thermal regenerator materials is progressively packed into a thermal regenerator to make most efficient use of their relative heat capacities with respect to the temperature gradient which develops upon use of a thermal regenerator.

If it is desired to fabricate a thermal regenerator to aid in obtaining cryogenic temperatures within certain more limited temperature ranges, one, two, or three of the above-named materials may be used in lieu of a combination of the four materials named.

DESCRIPTION OF THE PREFERRED EMBODIMENT

Figure 1:
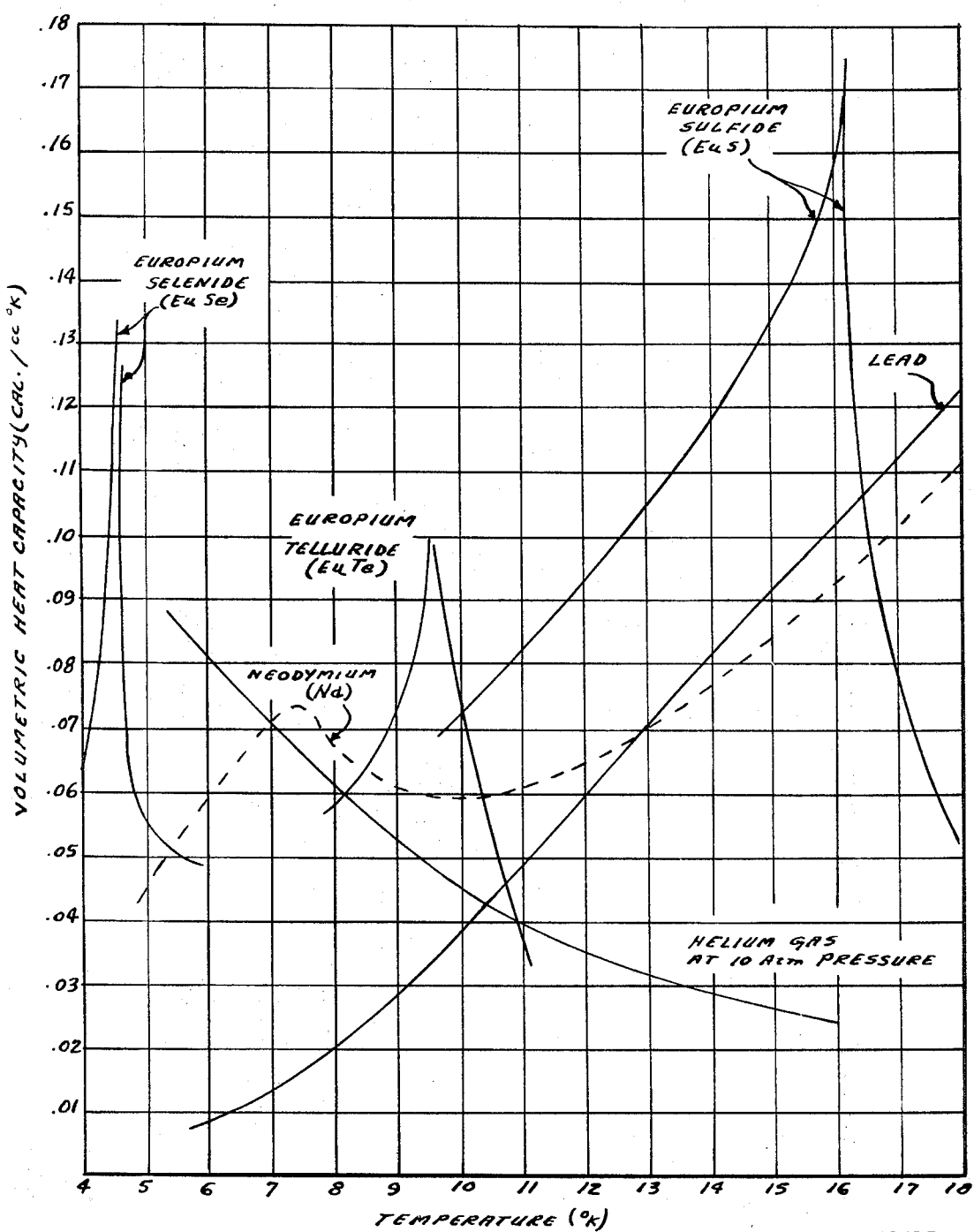
FIG. 1 is a plot showing the volumetric heat capacities of the thermal regenerator materials of this invention and their relationship to the volumetric heat capacities of helium gas and lead.

To more fully understand this invention consider FIG. 1 of the drawing. FIG. 1 is a plot of the liw temperature volumetric heat capacities of the thermal regenerator materials of this invention. FIG. 1 also shows the volumetric heat capacities of lead, the most commonly used prior art thermal regenerator material, and the volumetric heat capacity of helium gas under 10 atmospheres of pressure. Since cryogenic refrigerators of the Stirling cycle, pulse tube, and Vuilleumier types are generally rather small, and since added volume may decrease refrigerator efficiency, thermal regenerator materials are evaluated on the basis of heat capacity per unit volume. FIG. 1 clearly shows that the rare earth materials of this invention have volumetric heat capacities greater than lead (the best of the prior art materials) in the temperature range between about 16.4° K. and 4° K. The helium curve is included in FIG .1 to show why helium is theoretically excellent as a thermal regenerator material at low temperatures. The impracticality of helium gas as a thermal regenerator in actual cryogenic refrigerators has been mentioned above.

FIG. 1 indicates that europium sulfide has a volumetric heat capacity curve which rises from a relatively low value at 18° K. to a relatively high peak at about 16.2°

K. and then drops off again. Europium telluride, neodymium, and europium selenide exhibit similar curves reaching peaks at about 9.6° K., 7.5° K., and 4.6° K., respectively. As stated in the prior art section above, it is well known that thermal regenerators develop a temperature gradient from one end to the other when said thermal regenerators are in use. In order to take full advantage of the volumetric heat capacity peaks of the rare earth materials shown in FIG. 1, one may prepare a thermal regenerator by progressively packing a plurality of the materials into the regenerator. For example, all four of the materials could be packed with europium sulfide, which has its volumetric heat capacity peak at about 16.2° K., at the warmer end of the regenerator and europium selenide, which has its volumetric heat capacity peak at about 4.6° K. at the coldest end, and with europium telluride and neodymium placed between the extremes according to their volumetric heat capacity peaks.

From the foregoing discussion, it may readily be seen that thermal regenerators may be constructed utilizing one, two, or three of the four disclosed rare earth materials as thermal regenerator materials.

Figure 2:
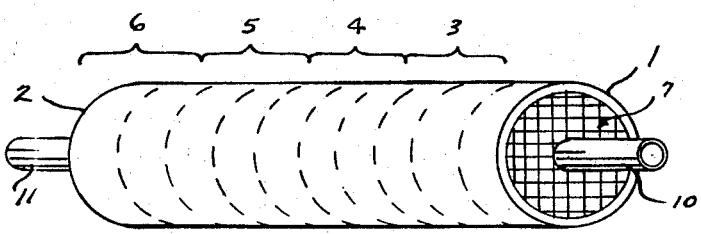
FIG. 2 is a schematic view of a thermal regenerator utilizing regenerator materials in the form of perforated discs.

FIG. 2 of the drawing shows a thermal regenerator which is a hollow container wherein a perforated disc form 7 of all four of the thermal regenerator materials of this invention have been packed. Assuming end 1 to be the end in which the warmest temperature develops when the thermal regenerator is in use, and assuming end 2 to be the colder end, the regenerator would be progressively packed in the following manner. Perforated discs of europium sulfide would be packed in the area designated by 3. Then would come europium telluride in area 4, followed by neodymium in area 5 and europium selenide in area 6.

Figure 3:
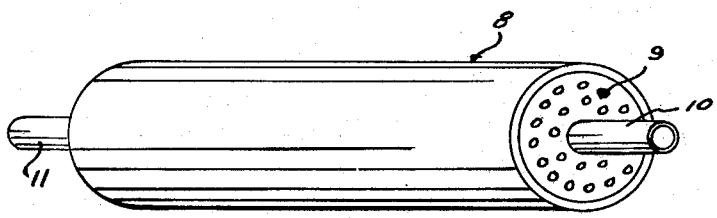
FIG. 3 is a schematic view of a thermal regenerator utilizing regenerator materials in the form of small spheres.

FIG. 3 of the drawing shows a hollow container 8 packed with small spheres 9 of any one of the rare earth materials of this invention. It is obvious that spheres of the regenerator materials could be progressively packed in the manner described for the perforated discs 7 of FIG. 2.

It should be repeated here that the thermal regenerators prepared with the rare earth materials of this invention will find their greatest use in the coldest expansion area of a multistage cryogenic refrigerator. Thermal regenerators making use of the materials of this invention may thus be used in conjunction with thermal regenerators utilizing prior art materials to provide cryogenic refrigerators which will efficiently produce temperatures down to 4° K. and lower.

Pipes 10 and 11 of FIGS. 2 and 3 are merely means for attaching the thermal regenerator to adjacent parts of a cryogenic refrigerator and allowing helium gas to pass back and forth through the regenerator. The pipes are generally fabricated from stainless steel as is the hollow container.

FIGS. 2 and 3 are, of course, cutaway views of thermal regenartors. That is, the ends covering the discs 7 and the spheres 9 are not shown in order that the discs 7 and the spheres 9 may be shown. The ends (not shown), like the rest of the hollow container, are usually constructed of stainless steel.

I claim:

1. A thermal regenerator for cryogenic refrigerators, operating at temperatures between about 16.4° K. and 4° K., said thermal regenerator comprising:
    (a) a hollow container with means for helium gas to enter and leave said hollow container, and
    (b) rare earth materials progressively packed within said hollow container, said rare earth materials consisting of europium sulfide, europium telluride, neodymium, and europium selenide with said rare earth materials being progressively packed in the order of their listing with europium sulfide being packed nearest the end of the regenerator which will exhibit the warmest temperature when the regenerator is in use.

2. A thermal regenerator according to claim 1 wherein the rare earth materials are in the form of perforated discs.

3. A thermal regenerator according to claim 1 wheren the rare earth materials are in the form of small spheres.

References Cited

UNITED STATES PATENTS

| | | | |
|---|---|---|---|
| 3,375,867 | 4/1968 | Daunt | 62—6 X |
| 3,397,738 | 8/1968 | Daunt | 62—6 X |

ROBERT A. O'LEARY, Primary Examiner

A. W. DAVIS, Jr., Assistant Examiner

U.S. Cl. X.R.

62—6